US011113656B2

(12) United States Patent
Wilkinson

(10) Patent No.: US 11,113,656 B2
(45) Date of Patent: Sep. 7, 2021

(54) SYSTEM FOR AUTOMATIC SIGNATURE FOR RECEIPT VERIFICATION

(71) Applicant: Walmart Apollo, LLC, Bentonville, AR (US)

(72) Inventor: Bruce Walter Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 445 days.

(21) Appl. No.: 15/204,021

(22) Filed: Jul. 7, 2016

(65) Prior Publication Data

US 2017/0053232 A1    Feb. 23, 2017

Related U.S. Application Data

(60) Provisional application No. 62/206,398, filed on Aug. 18, 2015.

(51) Int. Cl.
*G06Q 10/08* (2012.01)
*G07C 9/35* (2020.01)

(52) U.S. Cl.
CPC .......... *G06Q 10/0832* (2013.01); *G07C 9/35* (2020.01)

(58) Field of Classification Search
CPC .......... G06Q 10/0832; G06Q 10/0833; G06Q 10/08; G06Q 10/083; G06Q 10/0838;
(Continued)

(56) References Cited

U.S. PATENT DOCUMENTS 5,659,616 A    8/1997  Sudia
7,653,603 B1   1/2010  Holtkamp, Jr. et al.
(Continued)

FOREIGN PATENT DOCUMENTS

WO    2015100390 A1    7/2015

OTHER PUBLICATIONS

Verdon, J. (Apr. 10, 2013). Can Retailers Sell Delivery Lockers Idea? walmart.com, amazon.com Look To Put Boxes in Stores. Pittsburgh Post—Gazette Retrieved from https://dialog.proquest.com/professional/docview/1324953997?accountid=131444 (Year: 2013).*

(Continued)

*Primary Examiner* — Michael P Harrington

(57) ABSTRACT

Provided is a system for automatic signature for receipt verification. The system includes a delivery management server, wherein the deliver management server includes a memory and a processor. A digital copy of an authorized signature is stored in the memory of the delivery management server. The system also includes a delivery smart crate for receiving packages unattended. The delivery smart crate is in communication with the delivery management server through a network connection. The system also includes a delivery service in communication with the delivery management server through a network connection. The delivery service notifies the delivery management server of a signature request by a sender. The delivery smart crate notifies the delivery management server of a delivery made to the delivery smart crate. Also, the delivery management server sends the digital copy of the authorized signature to the delivery service.

20 Claims, 3 Drawing Sheets

(58) Field of Classification Search
CPC ........... G06Q 10/0835; G06Q 10/0836; G06Q 20/401; G07C 9/0015
See application file for complete search history.

(56) References Cited

U.S. PATENT DOCUMENTS

| | | | |
|---|---|---|---|
| 8,108,321 B2 | 1/2012 | Neal et al. | |
| 2004/0211834 A1* | 10/2004 | Fleckenstein | G06Q 10/08 235/385 |
| 2012/0089533 A1 | 4/2012 | Klingenberg et al. | |
| 2012/0130916 A1 | 5/2012 | Neal et al. | |
| 2013/0066744 A1* | 3/2013 | Higgins | G06Q 10/0833 705/26.41 |
| 2013/0088323 A1* | 4/2013 | Ryan | G06Q 10/08 340/5.7 |
| 2013/0212036 A1* | 8/2013 | Klingenberg | G06Q 10/00 705/337 |
| 2014/0254896 A1 | 9/2014 | Zhou et al. | |
| 2015/0106293 A1 | 4/2015 | Robinson et al. | |
| 2015/0106296 A1* | 4/2015 | Robinson | G06F 21/62 705/339 |
| 2015/0356801 A1* | 12/2015 | Nitu | G07C 9/00912 340/5.61 |
| 2015/0371187 A1* | 12/2015 | Irwin | G06Q 10/0836 705/72 |
| 2016/0098679 A1* | 4/2016 | Levy | G06Q 10/0836 705/28 |

OTHER PUBLICATIONS

Rose, S. (Oct. 26, 2012). Startup hopes to expand startup launches parcel pickup kiosks in GTA. Waterloo Region Record Retrieved from https://dialog.proquest.com/professional/docview/1115295482?accountid=131444 (Year: 2012).*
International Preliminary Report on Patentability in International Patent Application No. PCT/US16/41247, dated Mar. 1, 2018; 12 pages.
International Search Report & Written Opinion in counterpart International Patent Application No. PCT/US16/41247, dated Sep. 9, 2016; 10 pages.
RMail, https://www.rmail.com/.
Amazon Hub Locker, https://www.amazon.com/b?ie=UTF8&node=6442600011.
Parcel Pending, Outdoor Parcel Lockers, https://www.parcelpending.com/locker-solutions/outdoor-lockers/.

* cited by examiner

SYSTEM FOR AUTOMATIC SIGNATURE FOR RECEIPT VERIFICATION

RELATED APPLICATION

This application claims priority to U.S. Provisional Patent Application Ser. No. 62/206,398 to Walmart Stores Inc., filed Aug. 18, 2015 and entitled "System for Automatic Signature for Receipt Verification", which is hereby incorporated entirely herein by reference.

FIELD OF THE INVENTION

The invention relates generally to a system for package delivery of packages requiring signatures for delivery.

BACKGROUND

Often times package delivery requires a signature in order to effect delivery. Further, that signature typically needs to be an adult signature. The difficulty and delay in delivery often is a result of the delivery service having a difficult time obtaining a signature at the delivery address for various reasons including attempted delivery at a time when people typically work and are not available for a signature. Leaving such a package in an unattended secure delivery crate also has drawbacks since a signature is still required for delivery of such a package.

BRIEF SUMMARY

In one aspect, provided is a system for automatic signature for receipt verification, the system comprising: a smart crate for receiving packages unattended, wherein the smart crate comprises a memory and processor for storing and processing data; a delivery management server, wherein the deliver management server comprises a memory and a processor; and a network communication between the smart crate and the delivery management server, wherein the smart crate and the delivery management server jointly operate to send an authorized signature to a delivery service organization for packages requiring a signature to effect delivery of the package.

In another aspect, provided is a method of automatically signing for receipt verification, the method comprising: recording an authorized signature for a recipient in a database stored on memory of a delivery management server; receiving a request for signature for a delivery at the delivery management server; receiving a delivery notification at the delivery management server from a smart crate in response to delivery of a package for the recipient to the smart crate; sending the stored authorized signature for the recipient from the delivery management server to a delivery service organization in response to receiving the delivery notification; and sending an authorized recipient notification to the smart crate for restricting access to the smart crate to only the authorized recipient.

In another aspect, provided is a system for automatic signature for receipt verification. The system comprises a delivery management server, wherein the deliver management server comprises a memory and a processor, wherein a digital copy of an authorized signature is stored in the memory of the delivery management server; a delivery smart crate for receiving packages unattended, the delivery smart crate in communication with the delivery management server through a network connection; and a delivery service in communication with the delivery management server through a network connection, wherein: the delivery service notifies the delivery management server of a signature request by a sender; the delivery smart crate notifies the delivery management server of a delivery made to the delivery smart crate; and the delivery management server sends the digital copy of the authorized signature to the delivery service.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

People often times have packages delivered to them for various reasons. For example, some people prefer to shop online and have products delivered to their home in packages. This is a convenient and easy way for people to obtain goods they want to own. People also send gifts to others and often require a signature for delivery of the package retaining the gift.

Delivery of items, wherein a signature is required is becoming more difficult. With more and more adults working, the home is often unattended and therefore the opportunity for delivering a package requiring a signature needs to happen in times other than conventional business hours. This still does not always result in timely delivery of the packages.

In order to combat such delivery issues, people will often elect to deliver the package in a manner that does not require a signature. This is a less safe way to deliver items because it does not require that someone sign for the package and the package may be left on a front step and the like. The package left on a front step is often visible from the street and is a designator that no one is home at the time. Someone observing the delivery of the package may be able to take the package that is left unattended, or utilize the package on the doorstep as an indicator that no one is home and thereby is a target for other malicious behavior.

Figure 1:
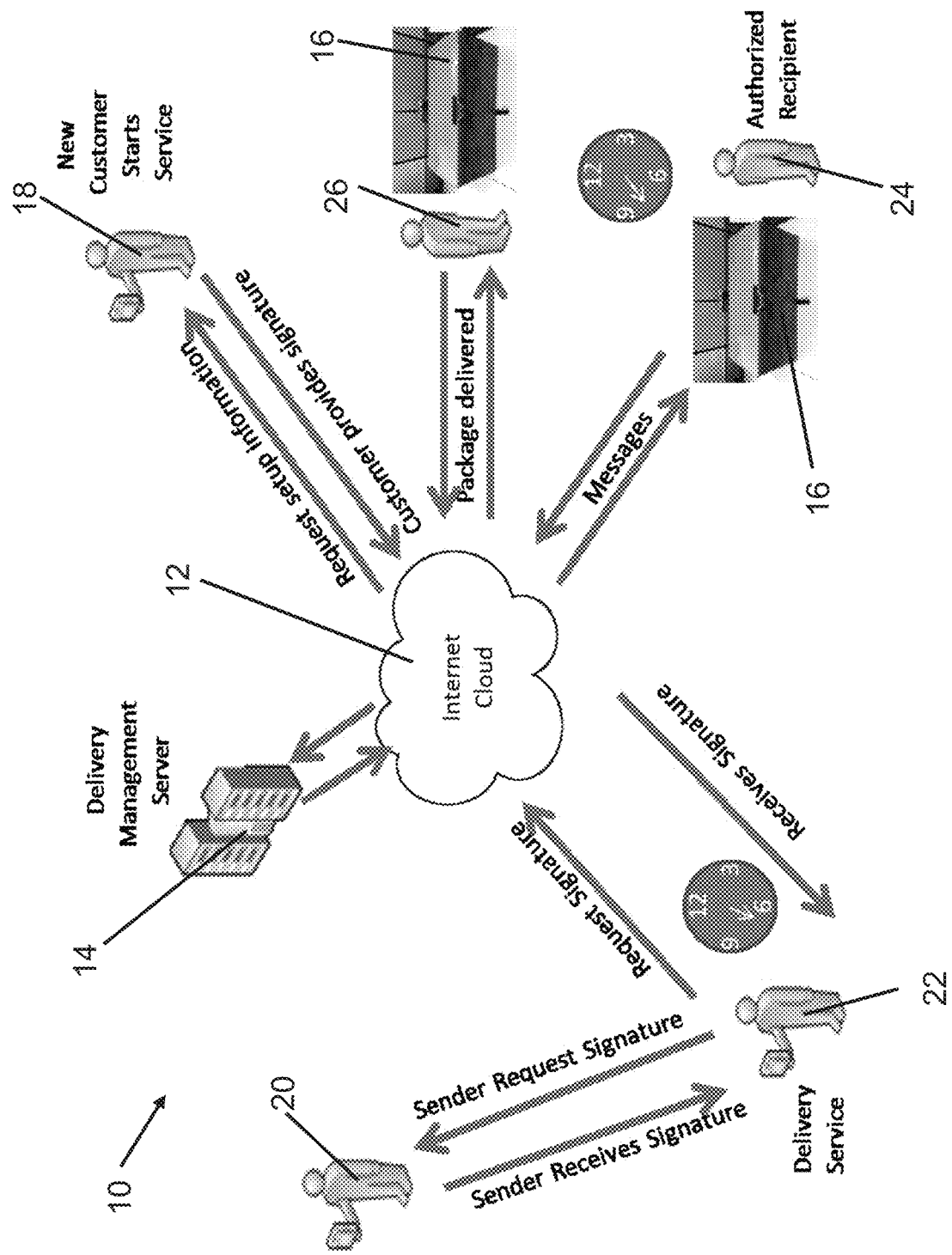
FIG. 1 is a block diagram of a system for automatic signature for receipt verification, in accordance with some embodiments.

FIG. 1 is a block diagram of a system for automatic signature for receipt verification.

The system for automatic signature for receipt verification 10 can include a network connection 12, a delivery management server 14, a delivery smart crate 16, and a delivery service 22. The network connection 12 provides a means for the various components of the system 10 to communicate with each other. The network connection 12 may be an Internet connection, a LAN, a WAN, a wireless network connection, a wired network connection and the like.

The delivery management server 14 comprises a memory and a processor. The memory can include volatile memory, for example, random access memory (RAM) and the like, and/or non-volatile memory, for example, read-only memory (ROM), flash memory, and the like. The memory can include removable and/or non-removable storage media implemented in accordance with methods and technologies known to those of ordinary skill in the art for storing data. Stored in the memory can include program code, such as program code of one or more of a processor, a database of authorized recipient signatures, a database of authorized recipient information, and the like. The delivery management server 14 may be a single machine, or in embodiments, it may be more than one machine that communicates with each other to function as a single unit. The processor receives and processes data related to sending and delivery of a package to a delivery smart crate 16. The processor executes program code to communicate with the authorized recipient, the delivery service 22, and the delivery smart crate 16. In executing the program code, the processor may determine who the authorized recipient is, communicate that with the delivery service 22 and communicate with the smart crate 16 to ensure that only the authorized recipient may access the internal compartment of the delivery smart crate 16 and retrieve the package sent from sender 20.

In some embodiments, the delivery management server 14 may coordinate with the network connection 12 to establish a cloud management system, wherein an Internet connection 12 communicates with cloud delivery management server 14.

The delivery smart crate 16 may be an unattended secure delivery crate. The delivery smart crate 16 may only be accessed by delivery service personnel 26 or by an authorized recipient 24. The delivery smart crate 16 includes a locking device that prevents access to all except the delivery service personnel 26 and the authorized recipient 24.

The delivery smart crate 16 may also include a memory and a processor. The memory can include volatile memory, for example, random access memory (RAM) and the like, and/or non-volatile memory, for example, read-only memory (ROM), flash memory, and the like. The memory can include removable and/or non-removable storage media implemented in accordance with methods and technologies known to those of ordinary skill in the art for storing data. Stored in the memory can include program code, such as program code of one or more of a processor, a database of authorized recipient signatures, a database of authorized recipient information, and the like. The delivery management server 14 may be a single machine, or in embodiments, it may be more than one machine that communicates with each other to function as a single unit. The processor receives and processes data related to delivery of a package to a delivery smart crate 16. The processor executes program code to communicate with the delivery management server 14. In executing the program code, the processor may determine that the package has been delivered in the delivery smart crate 16 and communicate that with the delivery management server 14 that the package has been delivered. The delivery management server 14 may then communicate to the delivery service 22 the stored signature for the authorized recipient 24.

Delivery service 22 may be any type of delivery service, such as, but not limited to, a postal carrier, a parcel service, and any company who is in the business of shipping letters and/or packages from a sender to a recipient. The delivery service 22 employs delivery service personnel 26 to deliver packages sent from a sender 20 to an authorized recipient 24.

Figure 2:
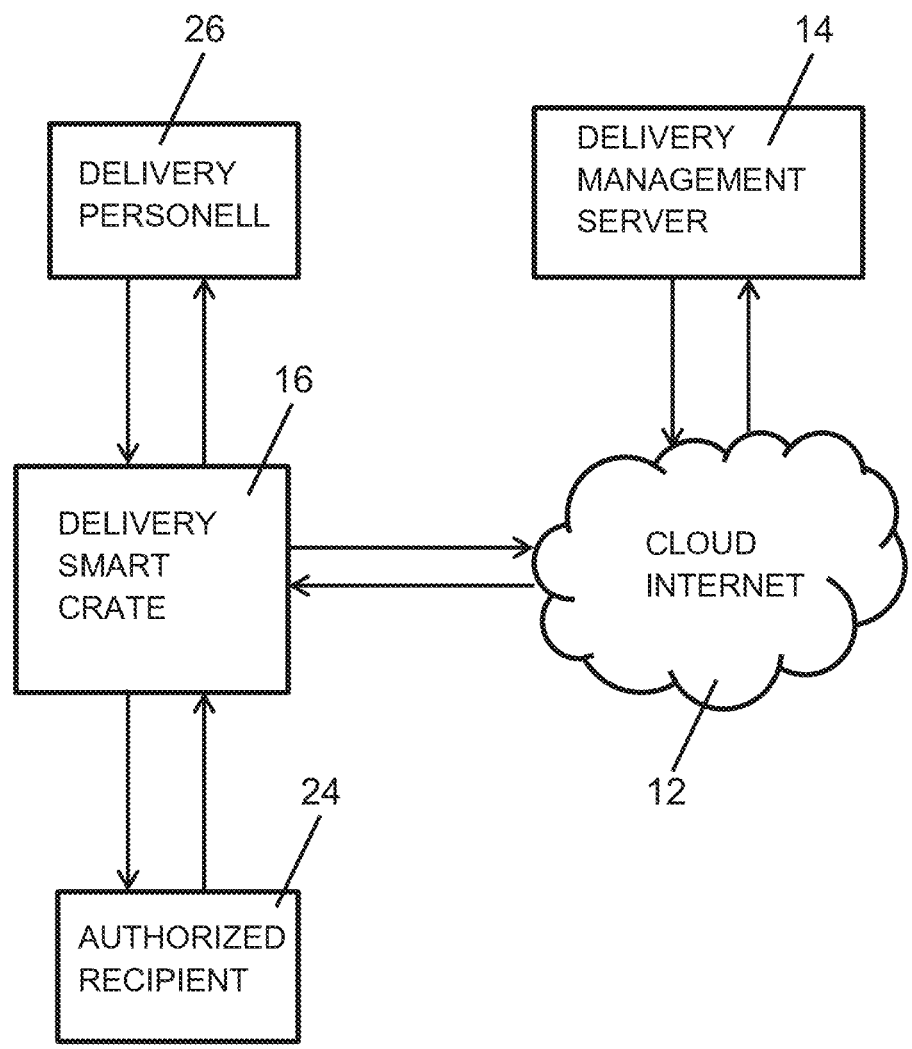
FIG. 2 is a block diagram of a portion of a system for automatic signature for receipt verification, in accordance with some embodiments.

With reference to FIGS. 1 and 2, in operation, a new customer 18 may establish a new account. This occurs by a new customer 18 communicating with the delivery management server 14 to provide a signature of each new customer and any other household member who the new customer 18 wishes to receive packages and/or letters in the delivery smart crate 16. The signature(s) is stored in a database on the memory of the delivery management server 14. Information regarding the customer, including customer's address is included as authorized recipient information. This information may be stored the memory of the delivery management server 14. Once a new customer 18 establishes a new account, the new customer 18 may now qualify as an authorized recipient 24, a delivery smart crate 16 is delivered and setup at authorized recipient's 24 mailing address to provide a location for delivery of packages and to provide a means of delivering a digital copy of a signature of the authorized recipient when a package is delivered to the delivery smart crate 16 and retrieved by the authorized recipient 26.

In operation, the sender 20 may request from the delivery service 22 that a signature be obtained in order to deliver a package to the authorized recipient 26. The delivery service 22 may then communicate with the delivery management server 14 through an Internet connection 12 or other network connection that an authorized signature notification for the authorized recipient 26 that a signature is required for delivery. The delivery management server 14 may execute code to determine that the recipient is indeed an authorized recipient 26.

Once the delivery management server 14 has confirmed that the authorized signature notification has been received and processed, the delivery service 22 may then ship the package through the typical means of shipping that the delivery service 22 utilizes. The last phase of the delivery process is delivery personnel 24 delivering a package and/or letter. The delivery personnel 24 may access the delivery smart crate 16 associated with the address of the authorized recipient 26. When the delivery smart crate 16 is opened and the package deposited within the delivery smart crate 16, the delivery smart crate 16 automatically sends a delivery notification through Internet connection 12 to the delivery management server 14. The delivery management server then processes the notification and automatically and immediately sends a digital copy of the signature for the authorized recipient 26 to the delivery service 22, who in turn provides the signature to the sender, thereby meeting the requirement of obtaining a signature from the intended recipient. The delivery management server 14 also automatically sends an authentication notification to the delivery smart crate 16, wherein the delivery smart crate 16 processes the notification and will only disengage the locking device when the authorized recipient 26 is requesting access. It should be appreciated that the system 10 provides the signature to the delivery service 22 substantially instantaneously upon delivery of the package to the delivery smart crate 16, as if the delivery personnel 24 was obtaining a live signature.

Various types of authentication for the authorized recipient 26 to access the delivery smart crate 16 may be a code stored in memory of the smart crate 16, a biometric input, or the like, wherein the authorized recipient 26 may be individually identified among other authorized recipients 26 that utilize the same delivery smart crate 16. It will be understood that once a package is delivered to the delivery smart crate 16, that in some embodiments, another package may not be delivered to the delivery smart crate 16 until the authorized recipient 26 access the delivery smart crate 16 and retrieves the package.

Figure 3:
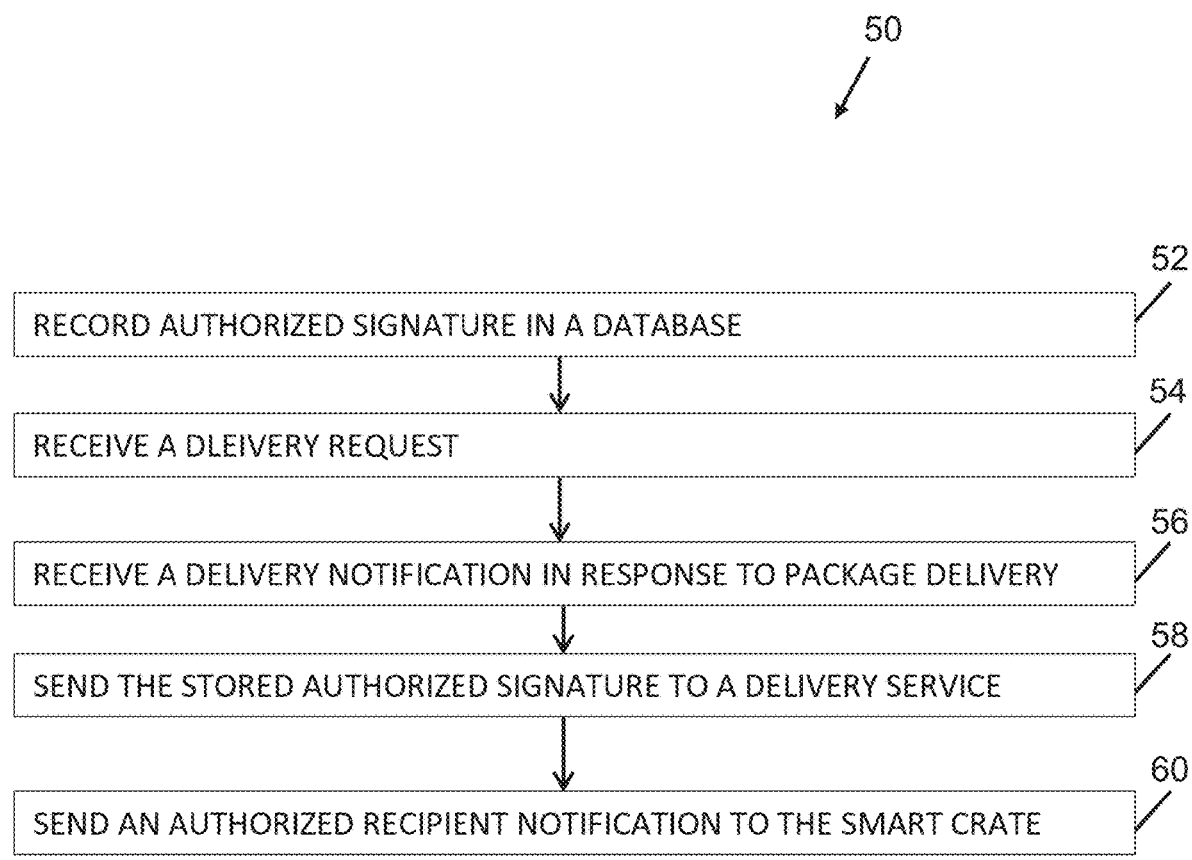
FIG. 3 is a flow diagram illustrating a method of automatically signing for receipt verification, in accordance with some embodiments.

FIG. 3 is a flow diagram illustrating a method 50 of automatically signing for receipt verification, in accordance with some embodiments. The method 50 can be initiated as block 52, by recording an authorized signature for a recipient in a database stored on memory of a delivery management server 14. Step 52 of method 50 may be included in establishing a new account for a recipient. Step 52 may also be included is a updating an account to add another authorized recipient.

The method 50 may then include as block 54, receiving a request for signature for a delivery at the delivery management server 14. Step 54 of the method 50 may be initiated by a sender 20 requesting from the delivery service 22 a signature for delivery of the package. The delivery service 22 may then request for signature for delivery at the delivery management server 14.

The method may then include as block 56, receiving a delivery notification at the delivery management server from a delivery smart crate in response to delivery of a package for the authorized recipient to the delivery smart crate 16. Step 56 of the method 50 may be accomplished automatically, wherein opening of the delivery smart crate 16 is a triggered event to send the delivery notification. The delivery notification may be sent from the delivery smart crate 16 to the delivery management server 14.

The method 50 may then include as block 58, sending the stored authorized signature for the authorized recipient from the delivery management server 14 to a delivery service 22 in response to receiving the delivery notification. Step 58 of the method 50 may occur automatically upon receipt of the delivery notification. In some embodiments, steps 56 and 58 of the method 50 may occur substantially instantaneously dependent on the speed of the network connection 12 established between the delivery smart crate 16 and the delivery management server 14 and the between the delivery management server 14 and the delivery service 22.

The method 50 may also include as block 60, sending an authorized recipient notification to the delivery smart crate 16 for restricting access to the delivery smart crate 16 to only the authorized recipient 26. Step 60 of the method 50 allows for only the authorized recipient to receive the package/letter. Because of the restricted access, the system 10 operates to obtain a signature and ensure delivery to the intended recipient who digitally supplied the signature. This allows users to receive and sign for packages/letters, even when not at the delivery location.

The method 50 may include other steps. For example and without limitation, the method 50 may include commissioning a secure unattended delivery smart crate 16 to an authorized recipient 26; and sending a notification to the authorized recipient 26 form the delivery management server 14 that package/letter was delivered to the delivery smart crate 16. It will be understood that other method steps may be present in order to effect the automatic signature for receipt verification in accordance with the present invention. The method 50 may also include establishing a network communication between the delivery management server and the delivery smart crate, wherein establishing the network communication between the delivery management server and the delivery smart crate comprises establishing an Internet connection between the delivery management server and the smart crate. Further, Step 52 of recording the authorized signature may further comprise recording a plurality of authorized signatures associated with a particular delivery smart crate.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system for automatic signature for receipt verification, the system comprising:
   a delivery smart crate located at an address of an authorized recipient for receiving packages unattended, wherein the delivery smart crate comprises a memory and processor forstoring and processing data;
   a delivery management server, wherein the delivery management server comprises a memory and a processor; and
   a network connection between the delivery smart crate and the delivery management server for communication between the delivery smart crate and the delivery management server, wherein the delivery smart crate and the delivery management server jointly operate to send an authorized signature to a delivery service organization for a package requiring a signature to effect delivery of the package, wherein:
   the delivery management server receives through the network connection a notification from the delivery service that the signature is required for delivery of the package to a recipient, and the delivery management server then processes the notification and automatically determines that the recipient is the authorized recipient with the authorized signature stored in the delivery management server and confirms the recipient is the authorized recipient and has the authorized signature stored to the delivery service prior to the delivery service shipping the package;
   the delivery smart crate automatically sends a delivery notification through the network connection to the delivery management server in response to the delivery smart crate being opened to receive the package and deposit of the package within the delivery smart crate, wherein, following the delivery notification being sent, additional access by the delivery service to the delivery smart crate is restricted until the package in retrieved by the authorized recipient; and
   the delivery management server then processes the delivery notification and automatically and immediately sends a digital copy of the signature for the authorized recipient to the delivery service; and
   the delivery management server then automatically sends an authentication notification to the delivery smart crate, wherein the delivery smart crate processes the authentication notification and will only disengage a locking device of the delivery smart crate in response to the authorized recipient requesting access.

2. The system of claim 1, wherein the delivery management server stores an individual digital copy of an individual authorized signature for each individual user of the delivery smart crate in the memory of the delivery management server, wherein each individual user is a household member of the authorized recipient and is authorized to access the delivery smart crate.

3. The system of claim 2, wherein the delivery management server receives an authorized signature notification from the delivery service organization and processes the authorized signature notification.

4. The system of claim 3, wherein the smart crate is opened by a delivery service personnel to deliver the package.

5. The system of claim 4, wherein the delivery management server is configuredto send the digital copy of the authorized signature to the delivery service organization.

6. The system of claim 5, wherein the delivery management server is configured to send a restriction notification to the delivery smart crate limiting opening of the delivery smart crate to only the authorized recipient for whom the package is intended, wherein the delivery smart crate processes and stores information from the restriction notification in order to restrict opening of the delivery smart crate to only the authorized recipient.

7. The system of claim 6, wherein the delivery smart crate opens in response to the authorized recipient requesting access at the delivery smart crate.

8. The system of claim 1, wherein the delivery smart crate is configured to disengage the locking device via at least one of a code provided by the authorized recipient or a biometric input of the authorized recipient.

9. A method of automatically signing for receipt verification, the method comprising:
   recording an authorized signature for a recipient in a database stored on memory of a delivery management server;
   commissioning a secure unattended delivery smart crate to an authorized recipient located at an address of the recipient;
   receiving a request for signature for a delivery at the delivery management server; automatically determining at the delivery management server that the recipient is the authorized recipient with the authorized signature stored in the delivery management server and sending confirmation the recipient is the authorized recipient and has the authorized signature stored to a delivery service prior to the delivery service shipping a package;
   receiving a delivery notification at the delivery management server automatically from the secure unattended delivery smart crate in response to the secure unattended delivery smart crate being opened to receive the package and delivery of the package for the authorized recipient to the secure unattended delivery smart crate, wherein, following the delivery notification being sent, additional access by the delivery service to the delivery smart crate is restricted until the package is retrieved by the authorized recipient;
   sending the stored authorized signature for the authorized recipient from the delivery management server to the delivery service in response to receiving the delivery notification; and
   sending an authorized recipient notification to the secure unattended delivery smart crate, wherein the secure unattended delivery smart crate processes the authorized recipient notification and will only disengage a locking device of the secure unattended delivery smart crate in response to the authorized recipient requesting access, thereby restricting access to the secure unattended delivery smart crate to only the authorized recipient.

10. The method of claim 9, further comprising:
   establishing a network communication between the delivery management server and the secure unattended delivery smart crate.

11. The method of claim 10, wherein establishing the network communication between the delivery management server and the secure unattended delivery smart crate comprises establishing an Internet connection between the delivery management server and the secure unattended delivery smart crate.

12. The method of claim 9, wherein recording the authorized signature further comprises recording a plurality of authorized signatures associated with a particular secure unattended delivery smart crate.

13. The method of claim 9, further comprising:
   sending a delivery receipt notification to the authorized recipient from the delivery management server that the package was delivered to the secure unattended delivery smart crate.

14. The method of claim 9, further comprising:
   receiving a delivery receipt notification at the delivery management server from the secure unattended delivery smart crate in response to delivery of the package for the authorized recipient to the secure unattended delivery smart crate;
   sending the stored authorized signature for the authorized recipient from the delivery management server to the delivery service in response to receiving the delivery receipt notification; and
   automatically sending an authorized recipient notification to the secure unattended delivery smart crate for restricting access to the secure unattended delivery smart crate to only the authorized recipient.

15. A system for automatic signature for receipt verification, the system comprising:
   a delivery management server, wherein the deliver management server comprises a memory and a processor, wherein a digital copy of an authorized signature for each of a plurality of authorized recipients is stored in the memory of the delivery management server;
   a delivery smart crate utilized by the plurality of authorized recipients for receiving packages unattended, the delivery smart crate in communication with the delivery management server through a network connection; and
   a delivery service computing device in communication with the delivery management server through a second network connection, wherein the delivery service computing device is configured to provide communication between a delivery service and the delivery management server, wherein:
      the delivery service notifies the delivery management server of a signature request by a sender for a recipient;
      the delivery management server then processes the notification of the signature request and automatically determines that the recipient an authorized recipient of the plurality of authorized recipients with a signature stored in the delivery service management server and confirms the recipient is an authorized recipient and has the signature stored to the delivery service prior to the delivery service shipping the package;
      the delivery smart crate automatically notifies the delivery management server of a delivery made to the delivery smart crate in response to the delivery smart crate being opened to receive the package and the package being deposited within the delivery smart crate, wherein, following the delivery notification being sent, additional access by the delivery service to the delivery smart crate is restricted until the package in retrieved by the authorized recipient;
      the delivery management server sends the digital copy of the authorized signature to the delivery service; and
      the delivery management server automatically sends an authentication notification to the delivery smart crate, wherein the delivery smart crate processes the authentication notification and will only disengage a locking device in response to the authorized recipient of the plurality of authorized recipients requesting access.

16. The system of claim 15, wherein the delivery management server stores digital copy of the authorized signature for each user of the delivery smart crate in the memoryof the delivery management server.

17. The system of claim 15, wherein the delivery smart crate sends a delivery receipt notification of delivery to the delivery management server in response to a delivery service personnel opening the delivery smart crate to deliver the package.

18. The system of claim 17, wherein the delivery smart crate automatically sends the delivery receipt notification of delivery.

19. The system of claim 15, wherein the delivery management server sends an authorized receipt notification to the delivery smart crate, wherein the delivery smart crate restricts access to the delivery smart crate to only the authorized recipient in response to processing the authorized receipt notification.

20. The system of claim 19, wherein the delivery smart crate opens in response to the authorized recipient requesting access at the delivery smart crate.

* * * * *